United States Patent [19]

Cass et al.

[11] 4,003,717
[45] Jan. 18, 1977

[54] METHOD AND APPARATUS FOR RECOVERING BY-PRODUCT SILT FINES FROM A SLURRY THEREOF

[75] Inventors: Boyd E. Cass, Ligonier; David W. Coate; Joseph R. Quigley, both of Pittsburgh, all of Pa.

[73] Assignee: Carad, Inc., Pittsburgh, Pa.

[22] Filed: June 27, 1975

[21] Appl. No.: 591,161

[52] U.S. Cl. .................................. 44/10 R; 44/13; 44/15 R; 75/3; 75/55
[51] Int. Cl.² ....................... C10L 5/00; C10L 5/22
[58] Field of Search ......... 44/2, 10 R, 10 E, 11–13; 75/3, 42, 55; 241/24

[56] References Cited

UNITED STATES PATENTS

| | | | |
|---|---|---|---|
| 817,115 | 4/1906 | Hills | 44/11 |
| 2,164,950 | 7/1939 | Schultz | 44/13 |
| 3,377,146 | 4/1968 | Von Stroh | 44/10 R |

FOREIGN PATENTS OR APPLICATIONS

| | | | |
|---|---|---|---|
| 1,902,649 | 9/1969 | Germany | 44/2 |

Primary Examiner—Carl F. Dees
Attorney, Agent, or Firm—Carothers and Carothers

[57] ABSTRACT

The present invention relates to a method and apparatus of recovering by-product fines, such as coal fines, by-product fines created in the manufacture and processing of metals or any very finely divided substance which may be of value when recovered to a usable form and which may be naturally found in the form of a silt or as the result of the manufacturing process, from a slurry or sludge thereof. The slurry mass is first treated to dissociate it into discreet units, if required, for further treatment to recover the fines contained within the discreet units of the slurry in the form of a usable end product. The discreet units of the dissociated slurry are conveyed through a rotary-driven impeller feed conveyor and simultaneously a hot gas such as air or superheated steam is flowed through the conveyor in contact with the slurry segments or discreet units. This combined action of the rotary impeller feed and the flow of hot air uniformly breaks up and dries the discreet slurry units into particles of desired moisture content. If additional drying is required, the present invention teaches the use of a second rotary-driven impeller feed conveyor in which the extruded agglomerates are conveyed while again simultaneously flowing a hot gas through this second conveyor in contact with the agglomerate to break up or size and further dry the agglomerates to a desired degree.

31 Claims, 2 Drawing Figures

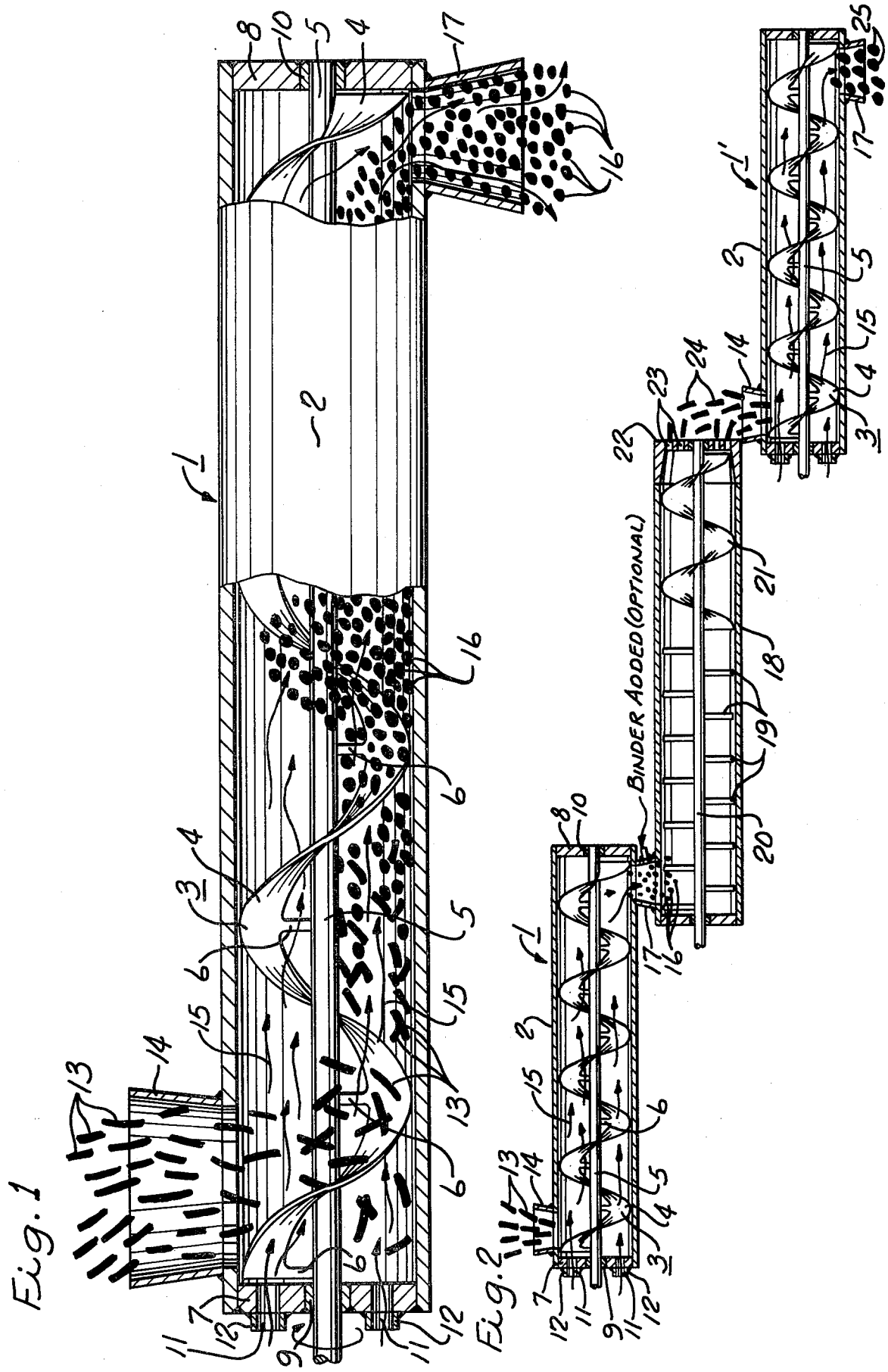

METHOD AND APPARATUS FOR RECOVERING BY-PRODUCT SILT FINES FROM A SLURRY THEREOF

BACKGROUND OF THE INVENTION

1. Field of the Invention

This invention relates to the recovery of material fines in slurry or sludge form to an agglomerate of usable size and moisture content for reuse in a process of manufacture, such as a fuel or metallurgical fluxing or conditioning agent, for example.

While the disclosure herein will be primarily related to the recovery of coal silt or fines from a slurry, it is to be recognized by those skilled in the art that the present invention is applicable to the recovery of any material fines found in slurry or sludge form. For example, it is often desirable to recover material fines from flue dust slurries created as a by-product in any of the metallurgical refining processes for reuse in agglomerated form as fluxing agents or slag conditioning agents, or as basic metallurgical ingredients in the production or refining of metals or other products. As merely one example of application, reference is made to U.S. Pat. No. 3,799,762 (assigned to the same assignee of record) wherein it is taught that waste or by-product dust from the manufacture of ferro-manganese may be utilized in a fluorspar slag conditioner. Such by-products may be recovered in accordance with the teachings of the present invention. For example, fluorspar-bearing sludge mixtures may be treated and dried successfully with the application of the teachings of this invention. The same would hold true for recovery of flue dust from a BOF steel refining process, for example, which are also generally found in the form of a slurry as a result of the use of water in scrubbers or other cleaning devices.

2. Discussion of the Prior Art

For convenience, discussion of the prior art will be made with particular reference to the recovery of coal silt.

In coal preparation plants, a considerable amount of fine coal is deposited in waste ponds known as settling or slurry ponds. These ponds are created by pumping the waste coal bearing slurries into ponds where the solids settle out and the clarified water is allowed to decant off. These waste slurries may originate from a number of sources or stages in the preparation and handling of the coal, such as from underflow from thickening operations, from water used in concentrating or separating tables, from overflow from chance cone systems, or from wet scrubbings from dust collectors utilized on drying or handling operations.

Throughout the country, there are many active and dormant settling ponds containing valuable coal fines. Although the chemical makeup of the fine coal in the ponds varies considerably from pond to pond as noted by H. Charmbury in *Characteristics of Coal Preparation Slurries*, Mining Engineering, January, 1960, page 49, many ponds contain coal which is of recoverable value. The coal in these ponds is generally in the form of a wet, cakey sludge or slurry containing a considerable amount of moisture, usually about 30% to 40%. The moisture content may vary considerably from pond to pond. In a survey made in the Commonwealth of Pennsylvania as noted in the aforementioned article, for example, the ash content of a dry basis may vary from approximately 10% to 40% and the sulfur content from approximately 1% to 3%. In addition, the settling ponds exist from both bituminous and anthracite preparation plants, and thus the BTU value of the coal contained in the ponds may vary substantially for all of the above reasons from pond to pond.

However, once it has been determined that the coal silt of a particular pond is of sufficient quality to warrant recovery, then the prior art basically teaches two possible ways to economically recover coal sludge from the settling ponds. The first involves drying the sludge down to from 7% to 12% moisture and reblending this material in small percentages into a prepared coal product. The other approach involves agglomerating the fines and using the agglomerate as a fuel source. The prior art of agglomerating coal fines is discussed at length in *The Application of the Pelletizing Process to the U.S. Coal Industry*, by P. T. Luckie and T. S. Spicer, 1965 Proceedings of the International Briquetting Association at page 61.

It may be noted in this article that a number of methods for agglomeration of coal fines have been proposed, including briquetting of coal fines, extrusion of coal silt and pelletizing. While some encouraging results were noted, nevertheless, in all three of these agglomeration processes there are three primary problems which have heretofore not been adequately or economically resolved.

These three primary problems which have not been heretofore resolved to an acceptable state, involved in the recovery of coal sludge from settling ponds are as follows: (1) handling the wet, cakey material; (2) drying the wet sludge down to an acceptable level; and (3) controlling coal dust problems and hazards associated with fine dry products. It will be noted that all three of these problems are encountered with the recovery of not only coal sludge from settling ponds, but in the recovery of any material sludge in related arts as previously explained.

The first two problems, handling and drying the coal sludge, may be considered together. In order to dry a wet, cakey material such as a coal sludge or a metallurgical by-product sludge, it is necessary to apply heat to the sludge and to move and expose enough sludge surface to allow the water to evaporate. Due to the sticky, cakey nature of the sludge, for example coal sludge at about 30% moisture as it comes from the ponds, this operation of handling and drying has proved to be extremely difficult to accomplish with conventional drying methods. For example, rotary kilns are not satisfactory for drying coal sludge, as the sludge will stick or ring up along the sides of the kiln thereby preventing the necessary exposure of free particle surfaces for drying. The material that does not break away from the sides of the kiln is over exposed to the heat and will thereby become excessively dry creating both a dangerous dust hazard and a non-uniform final product in regard to size and moisture content. In addition, a kiln is also large, cumbersome, expensive and somewhat difficult to regulate with regard to the manufacture of a controlled product.

Two prior art drying techniques are presently in use for drying coal sludge. The first involves the use of a vibratory conveyor which transports and fluidizes the sludge while hot air is being blown through it. This method is disclosed in *Hawley Successful in Adapting System For Recovering Ultra-Fines*, by R. Mason, Coal Mining and Processing, May, 1973. The chief shortcoming of this technique is that the coal sludge must first be dried to 22% moisture before it will fluidize on such a system. Thus, operations presently utilizing this system air dry the pond sludge by digging it out of the pond and turning it over from time to time in dry weather on the pond's banks until it contains less than 22% moisture. At first glance, it may be readily seen that effective bank drying is, of course, dependent upon dry weather conditions. A further shortcoming of the vibratory fluidizer system is its fuel limitation.

Ideally, when drying coal sludge, one would prefer to be able to burn coal as it is available on the site, and further in view of the fact that other fuels are now in short supply. The vibrating fluidizer consists of a vibrating screen deck with minute holes through which the hot air passes to fluidize the fine coal. Thus, burning coal directly to produce the required hot air is not possible with this system, as the ash from the coal quickly plugs the small openings or holes in the vibrating deck.

The second drying system presently in use is the "holo-flite" processor, which is a system incorporating an indirect heat exchange comprising a series of hollow rotating helical screw flights, through which a heat transfer agent is circulated, such as a hot oil. This method is disclosed in *Holo-Flite Processor for Drying Coal Fines*, presented to the Southwestern Virginia Coal Preparation and Engineering Society, February 18, 1974. These hot screw flights add heat to the coal sludge while gently moving and turning it over in order to release water and expose new surface area. However, the chief drawbacks with this particular approach are as follows: (1) there is no forced air or gas movement to speed and increase the drying efficiency; (2) the technique represents a large capital investment to install; (3) the parts that generally wear out and need replacement are the expensive holo-flite screws; and (4) no one at the present time manufactures a burner or system that will burn coal to create the hot oil, as the present burners known to the inventors use either gas or fuel oil.

It is a principal object of the present invention to eliminate all of the aforementioned disadvantages associated with the prior art methods of recovering sludge fines.

SUMMARY OF THE INVENTION

The present invention provides a method and apparatus for recovering fines from a sludge or slurry thereof, wherein the slurry mass is first dissociated into discreet units of the mass, if the sludge of the material being recovered so requires, as by shredding or extruding, for example. The dissociated slurry is conveyed through a tubular type conveyor having a rotary-driven impeller feed such as a closed ribbon screw (which has been discovered by the inventors to be the most unique and efficient impeller for obtaining the desired results, and therefore constitutes one feature of the present invention, but noting however, that nevertheless other type impellers which permit free passage of the gas will suffice). While the slurry units are being conveyed through the conveyor, hot gas (usually air) is also caused to flow or to be forced through the tubular conveyor in contact with the slurry units to uniformly break up and dry the slurry units into particles of substantially uniform size and desired moisture content. The resultant particles may be utilized in this form, or if particles of a larger size are required, then these particles are en masse subjected to extrusion to form larger agglomerates which may be broken or cut into desired lengths as they emerge from the extruder.

If further drying of the agglomerate is required, the present invention provides the additional unique feature whereby the step of breaking the agglomerates to the desired size and further drying is carried out in one step by conveying the extruded agglomerates through a second rotarydriven impeller feed conveyor while simultaneously flowing a hot gas through this second conveyor, as in the first, in contact with the extruded agglomerates to size and dry the agglomerates to the desired degree. The final moisture content of the products emerging from either the first or the second conveyor is accurately regulated by controlling at least one of the controls consisting of the rotary drive speed of the conveyor, the hot gas temperature, and the flow rate of the hot gas through the conveyor.

If desired, any conventional binder, such as ligninsulfonate, may be added in the recovery process during or just prior to the step of extrusion, or even in the first conveyor if conditions require it.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 1 is a simplified view in side elevation of a rotary-driven impeller feed conveyor for the drying and recovering of fines from a slurry thereof with portions removed for internal viewing.

FIG. 2 is a diagrammatic drawing showing in sequence from left to right the first hot gas rotary impeller conveyor as in FIG. 1, an extruder, and a second hot gas rotary impeller conveyor illustrating the method of the present invention.

DETAILED DESCRIPTION OF THE DRAWINGS

Referring to FIG. 1, the rotary-driven impeller feed conveyor 1 is comprised of an elongated tubular conveyor housing 2 enclosing a one-piece or continuous rotary-driven impeller 3, which in this instance is illustrated (and preferably so) as a closed ribbon screw 4 which is spaced from, carried by and axially wound about rotary drive shaft 5. Ribbon screw 4 is rigidly supported from and secured to drive shaft 5 by means of the periodically spaced supports 6.

Drive shaft 5 is supported for rotation respectively in the conveyor end walls 7 and 8 by means of bearings 9 and 10.

Hot gas inlets 11 are provided in conveyor end wall 7 for the entrance and passage of a forced hot gas, usually air, into and through housing 2 of the conveyor. Other means may be employed to connect the hot gas, such as top or side vent connections. Connectors 12 are provided for the connection of a hot forced air source. A plurality of passages 11 are preferably provided annularly about end wall or plate 7 to more uniformly distribute the forced air flow throughout the interior of conveyor 1, and thereby provide the best possible surface contact of the hot forced air with the material being conveyed therethrough. As the material which will be conveyed within the conveyor will tend to settle to the bottom thereof, the majority of the hot air passages 11 may be positioned about the upper portion of end plate 7 as those passages 11 at the bottom of the plate will be in contact or in line with the heavy bulk of the material being conveyed through the conveyor, thereby obstructing the free flow of the hot forced air.

An example of the method of the present invention will now be described with reference to the recovery of coal fines from a slurry thereof. As previously stated, the method and apparatus of the present invention is applicable to the recovery or drying of any fines from a slurry and reference to recovery of coal fines is by way of example only.

The coal sludge or slurry is generally found in the form of a wet, cakey sludge containing considerable moisture, usually about 30%. This cakey slurry mass is first dissociated into discreet units for treatment by any conventional device which can readily accomplish this task, such as an extruder or shredder. Sludges of other substances may or may not require dissociation depending upon their adhesion characteristics or tendency to cake.

When it is required or desirable to shred the wet sludge, as is normally the case with a coal sludge, such that it feeds into the hot gas ribbon screw conveyor in discreet pieces as opposed to a single cakey mass, the manner in which the wet sludge may be shredded to facilitate drying is dependent upon the type and moisture of the sludge to be dried. Before a sludge can be advantageously shredded, it must be at a moisture and consistency where it will not revert immediately into a cakey mass, but will maintain its shredded discreetness for at least a short period of time within the hot gas conveyor 1 such that the surface of each discreet shredded piece begins to dry in the ribbon screw conveyor such that caking cannot reoccur.

Some types of coal fine sludges can be successfully shredded in moisture ranges of 25% to 35%, for example. However, if the moisture content is higher than 35%, the material will generally be found to be too wet and the work exerted into the step of shredding will be wasted, as the shredded material will tend to immediately reform into a cakey sludge in the hot gas ribbon screw conveyor 1. With BOF sludge, the wet scrubbing solids from dust collection systems of a basic oxygen furnace, on the other hand, for example, can be successfully shredded at a moisture content of between 13% to 20%. At moisture contents higher than 20%, shredding or drying of the BOF sludge will generally be found to be ineffective, as the material tends to reform into a sludge.

A variety of equipment may be utilized to perform this shredding operation. For example, conventional top soil shredders have been successfully employed for this purpose by the inventors, such as manufactured by Lindig Manufacturing Corporation of St. Paul, Minnesota, which incorporate a series of high speed bladed shredding rotors which break the sludge into discreet pieces. Another type of shredder manufactured by Gleason Foundry Company, Inc. of Gleason, Tennessee, which employs a series of rotating cutter plates to shred the sludge into discreet pieces may be successfully employed. Also, a pug mill extruder or sealer can be used to shred the sludge. The pug mill extruder may be an auger driven extruder which forces the material through a multi-hole die. The sealer is an auger driven extruder which forces material through rotating cutter blades.

As previously pointed out, the final selection of the type of shredder to be employed is dependent upon the type of material being handled. If the material is too wet to be effectively shredded, it may be blended with a dry material or with the dry material issuing from the discharge end of the hot screw. With some materials, the action of pug knives tends to chop and ball the material to such an extent that further shredding is not necessary. In fact, the hot gas ribbon screw conveyor 1 illustrated in FIG. 1 may be modified in accordance with the teachings of the present invention by replacing the initial portion of the ribbon screw 4 at the left-hand end of the figure as viewed with angled pug knives to cut, ball and transport the material forward to the ribbon screw section of the conveyor. In such a configuration, the pug knives are staggered and freely permit the movement of hot air 15 through the conveyor 1. The angle at which the pug knives are slanted relative to the axis of drive shaft 5 may be regulated to determine the rate of material movement through this initial section of the hot gas ribbon screw conveyor 1. Thus, the step of dissociating the slurry mass may be carried out within the conveyor 1 itself.

Referring specifically again to the structure illustrated in the drawing, the slurry mass is first dissociated (if required) by whatever appropriate means desired, into discreet units 13, as illustrated in FIG. 1, which are fed into the hopper 14 of the rotary impeller conveyor 1.

The action of the ribbon screw 3 tends to break up the discreet shredded or extruded pieces of slurry mass 13 into smaller lengths or units as the hot air flow 15 through the conveyor 1 as indicated by the arrow 15 tends to surface dry these pieces or units such that they do not reunite or stick back together. The action of the ribbon screw offers a continually-moving large exposure of surface area of the slurry units to the hot air flow, thereby providing uniform drying. The movement of the ribbon screw 3 tends to carry the discreet pieces or units up and forward (to the right) as viewed in the Figure. When the discreet units 13 as carried by the ribbon screw 3 reach a sufficiently high position within the conveyor 1, they tend to roll over each other and to fall back into the hot moving air 15. This rolling action created by the ribbon screw together with uniform exposure to the hot air, tends to form the discreet units or pieces into smaller particles or balls as indicated generally at 16.

While any conventional rotary-driven impeller, such as an auger, may be utilized in conveyor 1, the ribbon screw 3 is preferred, as it provides a space between the drive shaft 5 and the flights of the ribbon 4, thereby permitting the hot air to pass more freely through the system giving greater exposure of the hot air to the moving particles or balls 16 being dried. Particles 16 of desired moisture content exit the conveyor 1 through chute 17.

The particles 16 exiting conveyor 1 through chute 17 are generally of uniform moisture content. The final moisture content of these particles may be accurately regulated by varying the r.p.m. of ribbon screw or impeller 3, by regulating the temperature of the hot air, or by regulating the hot air flow. In addition, any combination of these controls may also be regulated to control the final moisture of the conveyor output.

The particles 16 exiting the conveyor 1 may be directly utilized in this recovered form, as a fuel for example, or if larger agglomerates are required, additional method steps according to the teachings of the present invention are carried out as described hereinafter. These additional steps will be discussed in connection with FIG. 2.

The third problem as previously mentioned in regard to refining coal sludges is the dust hazard. Since most coal sludges consist primarily of −200 mesh material, when this sludge is dried below 10% moisture, dust becomes a significant problem. While the particles 16 which exit the conveyor 1 may be controlled as to moisture content, if the particles are dried to 10% or less moisture content, then undesirable dust hazards may arise. Since, in the case of the recovery of coal fines as opposed to recovery of other fines, it is desirable to have a moisture content in the final agglomerate which is less than 10% so that it may be used more effectively as a fuel, further agglomeration of these particles into larger units may be desirable.

The present inventors have discovered that if the coal is to be agglomerated, the aforementioned conveyor 1 or hot air ribbon screw used in combination with an extruder makes a very unique and practical agglomerating system. By experimentation, the inventors have found that if the coal particles 16 exiting the hot air conveyor 1 are controlled to have a moisture content of 15% to 25%, these particles may be extruded en masse, with or without the addition of a binder, depending upon the natural constituents of the sludge, may be extruded with any conventional extruder such as an auger extruder, through a multiple hole die into larger agglomerates with very good results.

In actual experimentation with coal fines, a coal sludge of approximately 30% moisture content was first dissociated into discreet units with a shredder or extruder as previously explained, and these units were fed into the hot air ribbon screw conveyor 1. The conveyor 1 was controlled to emit particles 16 with a moisture content from 18% to 22%. Best results were obtained in this moisture range, although it was also found that acceptable results were obtained beyond these limits in the range of 15% to 25%. These particles with the addition of 0.25% to 2% ligninsulfonate as a binder were extruded en masse in an auger extruder through a multiple hole die having openings of a common diameter which may vary, for example, from ½ inch to 1¼ inch in diameter for different dies.

This is illustrated diagrammatically in FIG. 2, wherein it may be seen that the discreet units or dissociated sludge 13 is fed into the hot air conveyor 1 (which is a diagrammatic illustration of the structure shown in FIG. 1) and the particles 16 exiting therefrom are fed into extruder 18. Extruder 18 is diagrammatically illustrated as having paddles or blades 19 which radially extend from the central rotary shaft 20 thereof, and an auger 21 which forces the material through die 22 having multiple extrusion openings 23.

The blades 19 have a configuration and pitch similar to a fan blade such that they further break up and divide the material being fed to the extruder while simultaneously pushing it forward to auger 21, whereby the material is extruded through die 22.

The material exits die 22 in the form of extruded agglomerates 24 which are larger in diameter than the unextruded particles 16. The extruded agglomerates 24 must be broken into units of desired length for handling, and may be further dried if necessary, to a final moisture content.

The extruded agglomerates emerging from the die 22 may be broken off or cut at suitable lengths by any conventional device such as a periodically-manipulated breaker bar being passed across the face of the die. The present inventors, however, have discovered an additional unique method step wherein these extruded agglomerates 24 may be simultaneously broken down to a desirable size while being dried to a desired final moisture content by processing the extruded agglomerates through a second hot air conveyor 1' which is identical in basic structure as conveyor 1. This hot air conveyor 1' is diagrammatically illustrated in FIG. 2, and includes the same elements as conveyor 1, and thus like elements are designated with the same reference numerals. The operation of the conveyor 1' is identical to that of conveyor 1 with the exception that the three aforementioned variables of r.p.m., air temperature and air flow may be regulated to different degrees in order to determine the final content of the sized agglomerates 25.

Continuing with the aforementioned example of agglomeration carried out by the inventors, the continuous extruded coal agglomerates 24 were then cut or broken into small units from ¼ to 4 long in hot air conveyor 1' while being simultaneously dried down to a final moisture content of 5% to 10% in the form of agglomerates 25 of relatively uniform size and dryness as mentioned. The agglomerates 25 were found to have very good form or shape and hardness, and were suitable for easy handling, shipping and burning as a fuel.

In conducting experiments, the inventors discovered that depending upon the inherent ingredients of the sludge being processed, the addition of a binder is optional. For example, it was found that some coal sludges contain sufficient natural binders, such as clay, thereby eliminating the need to add additional binders. Any conventional binder may be utilized depending upon the product being processed. For example, in processing coal fines, any one or more of the following binders such as, but not limited to, bentonite, lignin solutions, cornflower products, humic acids, and calcium hydroxide may be utilized. These binders are thoroughly mixed with the particles 16 by the action of the extruder.

Since proper extrusion in extruder 18 depends upon having a head feed with controlled moisture, the hot air ribbon screw conveyor 1 provides an inexpensive, efficient and controlled means for introducing head feed of the proper moisture content to the extruder. In summary, the inventors have also discovered that extruding the continuous agglomerates 24 directly into a second hot air ribbon screw conveyor is an efficient method for breaking the extrusions into units of proper length while drying them to the desired final moisture content at the same time. However, conventional methods of cutting the extruded agglomerates and otherwise heat treating them to a desired final moisture content may be substituted. By using the final rotary impeller conveyor 1' of the present invention, the final extrusion columns or agglomerates 24 are broken up and dried but the hot air ribbon screw does not roll the agglomerates into balls due to the fact that the agglomerates are extruded under considerable pressure and at a low moisture content, with the result that the final product consists of dry cylindrical rods of different lengths suitable for shipping and burning as a fuel.

Many materials and combinations of materials have been suggested and used as slag conditioners for iron and steel making processes, including $CaF_2$, Mn, and Fe bearing compounds, and Al bearing compounds. Due to the growing concern over air pollution, an increasing number of wet scrubber dust collection systems have been placed in operation. These systems produce the above-mentioned valuable fluxing materials in the form of waste sludges or slurries, which are often discarded due to their unmanageable nature. $CaF_2$, for example, (see U.S. Pat. No. 3,799,762) is available in the form of a wet waste slurry as a by-product such as produced from the manufacture of aluminum and/or other chemical processes.

Iron and ferro-manganese bearing sludges and dusts are also available from dust collection systems of both basic oxygen and blast furnaces. U.S. Pat. No. 3,320,052 further discloses that Al bearing sludges are available as wet scrubber collection wastes or as red mud, a product of aluminum production.

It has been found that the hot air ribbon screw or conveyor 1 of the present invention is particularly well suited for drying down all of the above-mentioned sludges, either by themselves or in various combinations with other sludges and/or binders and/or dry materials in order to obtain a resultant dry granular material suitable for shipping or a partially dried head feed material suitable for briquetting, extrusion or other agglomeration processes.

For example, in accordance with the teachings of U.S. Pat. No. 3,799,762, waste $CaF_2$ sludge and/or filtercake fluorspar, dry ferro-manganese dust, waste BOF sludge and a suitable binder can be mixed together in an open pug mill to produce a wet sludge containing 10% to 15% moisture. Suitable water soluble binders may include, for example, 1 – 6% molasses, sodium silicate, ligninsulfonate, or various water soluble starches. This mixture may then be shredded, if required, or discharged directly into the hot air ribbon screw of the present invention and dried directly down to a finished product in the form of a dry, granular or semi-granular material suitable for shipping and for use as a slag conditioning agent containing 10 – 55 units of $CaF_2$, 5 – 20 units of manganese, and 5 – 25 units of iron. Alternatively, the hot air ribbon screw of the present invention may be used to just partially dry the material to 4% to 6% moisture where it may then be processed in a briquetting press to produce a higher grade agglomerate.

In addition to the utilization of waste sludges, the hot air ribbon screw or conveyor of the present invention offers some additional advantages over the prior art briquetting practice, wherein a liquid binder is generally added to a dry and sometimes dusty material to produce a sticky, briquettable product. The ribbon screw conveyor of the present invention allows for the mixing of the water soluble binder into the material in a wet state, which allows for a much more efficient and uniform distribution of the binder and thus allows the requirement for a smaller percentage of binder.

In addition to this benefit of a lesser requirement of binder, the hot air ribbon screw also allows for a nearly dust-free operation, since the material does not have to be over dried to a dusty condition and then re-wet with a binder as is done in conventional briquetting practices.

We claim:

1. The method of recovering fines from a sludge thereof comprising the steps of loosely conveying the sludge through a tubular conveyor housing with a continuous rotary-driven impeller, and simultaneously flowing a hot gas in contact with the sludge being conveyed through the conveyor housing to uniformly break up and dry the sludge by evaporation into particles of desired moisture content.

2. The method of claim 1 wherein the conveyor impeller is a ribbon screw.

3. The method of recovering fines from a slurry thereof comprising the steps of dissociating the slurry mass into discreet units, loosely conveying the dissociated slurry through a tubular conveyor housing with a continuous rotary-driven impeller while simultaneously flowing hot gas in contact with said discreet units through said conveyor housing to uniformly break up and dry said discreet units by evaporation into particles of desired moisture content.

4. The method of claim 3 which includes the step of controlling the final moisture content of said particles by regulating at least one of the controls consisting of the rotary drive speed of the conveyor, the hot gas temperature, and the flow rate of the hot gas through the conveyor.

5. The method of claim 4 which also includes the step of extruding said particles en masse into larger agglomerates.

6. The method of claim 5 which also includes the step of loosely conveying the extruded agglomerates through a second tubular conveyor housing with a continous rotary-driven impeller while simultaneously flowing hot gas through said second conveyor in contact with said agglomerates to size and dry said agglomerates by evaporation to a desired degree.

7. The method of claim 6 which includes the step of controlling the final moisture content of said agglomerates by regulating at least one of the controls of said second conveyor consisting of the rotary drive speed of the conveyor, the hot gas temperature, and the flow rate of the hot gas through the conveyor.

8. The method of claim 3 which also includes the step of adding a binder to said particles before conveying.

9. The method of claim 3 wherein the step of dissociating said slurry is carried out by shredding said slurry.

10. The method of claim 3 wherein the step of dissociating said slurry is carried out by extruding said slurry.

11. The method of claim 3 wherein the rotary-driven impeller utilized in the conveyor is a ribbon screw.

12. The method of recovering coal fines from a slurry thereof having a moisture content in the area of 30% or more, comprising the steps of dissociating the slurry mass into discreet units, loosely conveying the dissociated coal slurry through a tubular conveyor housing with a continuous rotary-driven impeller while simultaneously flowing hot air in contact with said discreet units through said conveyor housing to uniformly break up and dry said discreet units by evaporation into particles having a moisture content of about 15% to 25%.

13. The method of claim 12 which includes the step of controlling the final moisture content of said particles by regulating at least one of the controls consisting of the rotary drive speed of the conveyor, the hot air temperature, and the flow rate of the hot air through the conveyor.

14. The method of claim 12 which also includes the step of extruding said particles en masse into larger agglomerates.

15. The method of claim 14 which also includes the step of loosely conveying the extruded agglomerates through a second tubular conveyor housing with a continuous rotary-driven impeller while simultaneously flowing hot air through said second conveyor housing in contact with said agglomerates to size said agglomerates and dry the same by evaporation to a final moisture content of 5% to 10%.

16. The method of claim 15 which includes the step of controlling the final moisture content of said agglomerates by regulating at least one of the controls for said second conveyor consisting of the rotary drive speed of the conveyor, the hot air temperature, and the flow rate of the hot air through the conveyor.

17. The method of claim 12 which also includes the step of adding a binder to said particles before extrusion.

18. The method of claim 17 wherein said binder is selected from one or more of the group consisting of bentonite, ligninsulfonate, humic acids, cornflower starches and calcium hydroxide.

19. The method of claim 18 wherein said binder is ligninsulfonate selected in the range of 0.25 to 2%.

20. The method of claim 12 wherein the step of dissociating said slurry is carried out by shredding said slurry.

21. The method of claim 12 wherein the step of dissociating said slurry is carried out by extruding said slurry.

22. The method of claim 12 wherein the rotary-driven impeller utilized in the conveyor is a ribbon screw.

23. Apparatus for recovery of fines from a slurry thereof comprising means to dissociate the slurry mass into discreet units, conveyor means fed in tandem from said dissociation means and having a tubular conveyor housing with a continuous rotary-driven impeller to break up said discreet units into particles while loosely conveying the same, and means for forcing hot gas through said conveyor housing to dry said particles by evaporation to a desired degree.

24. The apparatus of claim 23 including an extruder fed in tandem from said conveyor means to extrude said particles en masse into agglomerates of a desired size.

25. The apparatus of claim 24 including second conveyor means fed in tandem from said extruder and having a tubular conveyor housing with a continuous rotary-driven impeller to break up said extruded agglomerates to a desired size while loosely conveying the same, and means for forcing hot gas through said second conveyor housing to dry said agglomerates to a desired degree.

26. The apparatus of claim 23 wherein the impeller in said conveyor means is a ribbon screw.

27. The apparatus of claim 23 wherein said dissociation means consists of an extruder.

28. The apparatus of claim 23 wherein said dissociation means consists of a shredder.

29. The apparatus of claim 23 wherein said dissociation means is integrally included in said conveyor means.

30. Apparatus for recovery of fines from a slurry thereof comprising conveyor means having an elongated continuous rotary-driven impeller to break up and loosely convey said slurry, and means for forcing hot gas through said conveyor in contact with the slurry being conveyed to dry the same by evaporation to a desired degree.

31. The apparatus of claim 30 wherein said impeller is a ribbon screw.

* * * * *